United States Patent [19]

Lausberg et al.

[11] 4,422,791
[45] Dec. 27, 1983

[54] UNIVERSAL JOINT CONSTRUCTION FOR USE IN ANCHORING A SURFACE PLATFORM TO A SEA BED

[75] Inventors: Helmut Lausberg, Oberhausen; Karl-Werner Pommerening, Dortmund, both of Fed. Rep. of Germany

[73] Assignee: M.A.N. Maschinenfabrik Augsburg Nürnberg Aktiengesellschaft, Fed. Rep. of Germany

[21] Appl. No.: 366,207

[22] Filed: Apr. 7, 1982

[30] Foreign Application Priority Data

Apr. 27, 1981 [DE] Fed. Rep. of Germany ....... 3116626

[51] Int. Cl.³ ............................................. F16C 11/00
[52] U.S. Cl. .................................... 403/39; 403/135; 405/201
[58] Field of Search ................... 403/122, 135, 39, 40, 403/36; 405/201; 384/108, 111; 277/34.3; 285/94, 261

[56] References Cited

U.S. PATENT DOCUMENTS

| | | | |
|---|---|---|---|
| 2,286,122 | 6/1942 | Stapp | 285/94 |
| 3,306,636 | 2/1967 | Hereth | 285/94 |
| 4,139,221 | 2/1979 | Shotbolt | 285/261 |

FOREIGN PATENT DOCUMENTS

262700 6/1968 Austria ................................ 285/261

*Primary Examiner*—Andrew V. Kundrat
*Assistant Examiner*—Joseph A. Fischetti
*Attorney, Agent, or Firm*—McGlew and Tuttle

[57] ABSTRACT

The universal joint construction for use at the bottom of a connection between a surface platform and a foundation anchored on the bottom of the sea comprises an outer top ball cup which is adapted to be connected up to the platform and an inner bottom ball cup disposed within the outer top ball cup enclosing the bottom thereof. The inner ball cup has an exterior in slidable engagement with the interior of the outer ball cup and a bell forming an enclosed pressure space is defined between the exterior of the upper cup and the bottom cup. In addition a ring seal bearing is defined between the inner bottom ball cup and the outer top ball cup adjacent the edge of the outer top ball cup. The interior of the bottom ball cup carries a plurality of shoes which bear in sliding engagement with the interior of the top ball cup. The shoes comprise a supporting plate having a substantially trapezoidal contour secured to the inner bottom ball cup and a sliding layer disposed within the contour of the supporting plate which has a border strip edge which extends around the sliding layer. In addition a border sealer is disposed around the exterior of the border strip. A bell is provided which forms an enclosed pressure space between the exterior of the outer top ball cup and the exterior of the inner bottom ball cup. Sliding layers advantageously may be provided with a lubricant by circulating it through passages defined in the inner cup and it advantageously projects higher from the surface of the inner ball cup into sliding engagement with the interior surface of the top ball cup. The shoes are advantageously a plurality of spherical segments of generally trapezoidal form with a smaller one defining almost a triangular configuration disposed between the two adjacent larger sliding layers.

26 Claims, 9 Drawing Figures

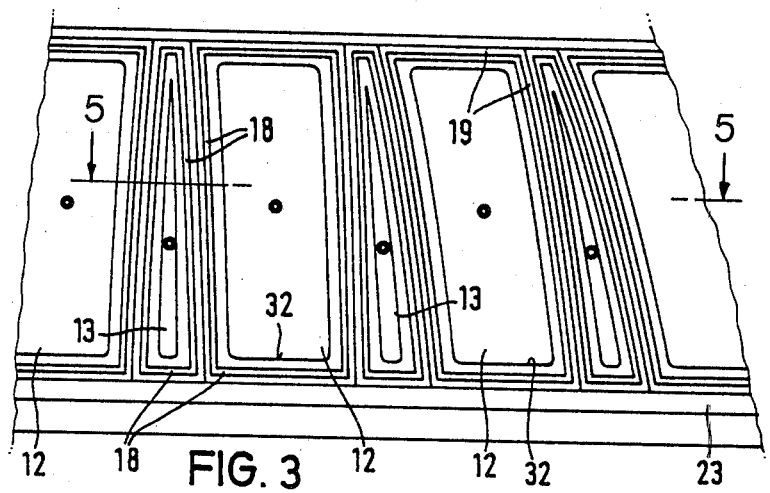
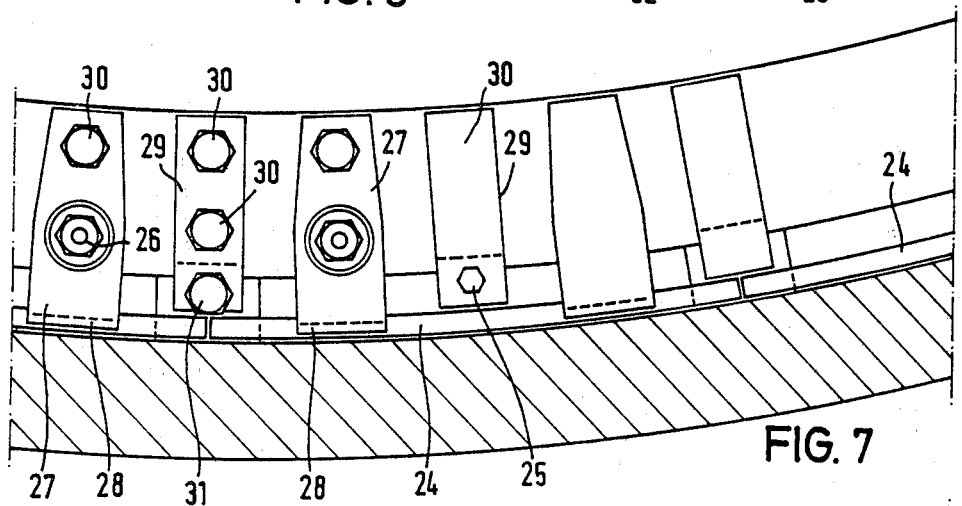
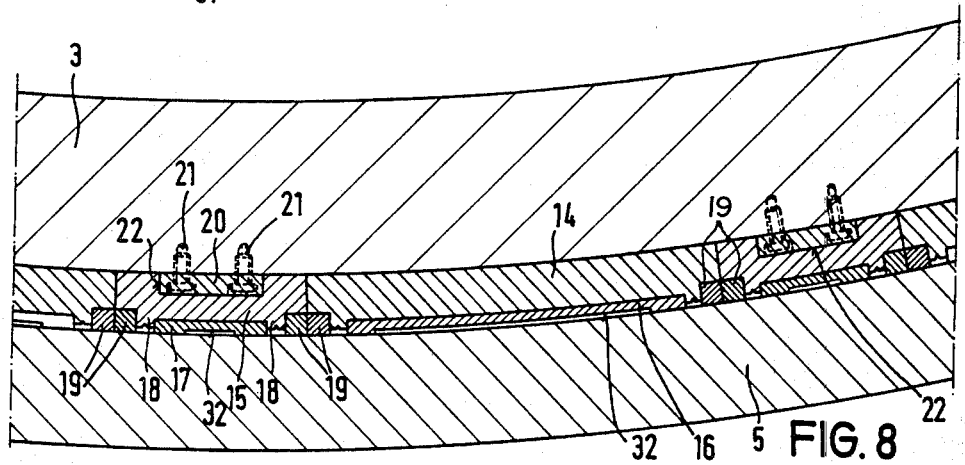

UNIVERSAL JOINT CONSTRUCTION FOR USE IN ANCHORING A SURFACE PLATFORM TO A SEA BED

FIELD AND BACKGROUND OF THE INVENTION

The invention relates in general to sea platform anchors and in particular to a new and useful universal joint provided with shoes at the bottom end of a connection between a surface platform and a foundation anchored on the bottom of the sea as well as to a method for replacing the shoes.

Such surface platforms for depths down to 300 m and for heavy seas with strong storms, as they prevail particularly in the Baltic Sea, require an extremely great engineering effort, if they are to be laid out for a 30-year stability. The problem is therefore to ensure the operating safety of the universal joint used on the bottom of the sea under these difficult conditions for this period of time. It has already been suggested to equip such a universal joint with replaceable shoes which have a coat of PTFE. Measures must be taken here to protect the ball surface on which the shoes slide from corrosion by the sea water. For this purpose it has been suggested to use an air or gas filled bell which is open at the bottom. Nevertheless the free sliding ball surfaces can be contaminated by foreign bodies from the sea water, which can get into the sliding gap. In this way and also by normal wear due to abrasion, the sliding layers of the shoes can become unusable.

SUMMARY OF THE INVENTION

The invention ensures the full operating and sliding capacity of the ball cups in one another under severe conditions for at least 30 years or longer, by providing better protection for the sliding surfaces and sliding layers and by obtaining and maintaining a floating friction, as well as by a design of the shoes which facilitates the replacement, as well as by an advantageous method for replacing the shoes.

The invention concerns a universal joint with shoes whose top outer ball cup embracing the bottom inner ball cup is provided with an air or gas filled bell, open at the bottom, as well as with a circular seal bearing on the inner ball cup. The invention provides spherical supporting plates with trapezodial contours and sliding layers secured on the plates and sliding on the inner surface of the surrounding outer ball cup. The plates are bordered on all sides by border strips of the supporting plates and are provided with border seals embedded on all sides along the border strips in their corner grooves. The strips bear tightly on the surface of the outer ball cup.

The arrangement of the shoes on the inner ball cup permits access and replacement from the inside of the universal joint. The insertion of the sliding layer in a frame enclosed on all sides by the border strip ensures a safe reception against displacement and prevents the sliding material from flowing, if it consists of PTFE. The border seals embedded in the corner grooves on the lateral border strip of the adjoining shoes and the edge of the supporting plates seal the sliding layer against impurities.

According to the invention it is advantageous to arrange the individual shoes adjoining each other in a ring-shaped, spherical zone, so that the supporting plates of the shoes, which are trapezoidal in a top view, bear tightly with their border seals embedded in the corner grooves of the border strips on the lateral border seals of the laterally adjoining shoes.

According to essential features of the invention, the supporting plates of the shoes are guided slidingly and removably in guideways in polar directions, whereby the guideways are formed by the respective adjoining supporting plates, or guide bars serve as guideways which are secured on the surface of the inner ball cup extending in polar directions and on which the supporting plates can slide along in corresponding grooves on the underside.

The arrangement can also be such that guide bars are provided for every second of the laterally adjoining supporting plates of the shoes. If the shoes are arranged side by side in a ring-shaped zone, as suggested by the invention, only every second supporting plate requires a guide bar as a guideway, because the supporting plates in between guide themselves on the supporting plates guided by the bars, with their lateral border seals adjoining each other.

Independent of this preferred arrangement, all supporting plates of the shoes, whether they adjoin each other or not, can be provided with guide bars. The removal of the supporting plate at the top of the inner ball cup and the reintroduction of a replacement supporting plate is always facilitated, and the exact fit of the supporting plates is ensured.

Another advantageous design is obtained if the trapezodial supporting plates of the shoes are tapered alternately at the top and bottom. They can have either the same width or the supporting plates of the shoes guided removably on guide bars can be much narrower than the adjoining supporting plates.

Another advantageous design according to the invention includes supporting plates which bear with their border seals on their underside on a circular boundary border strip arranged on the inner ball cup, so that the border seals are enclosed in U-form in this region, while they can be pressed by adjusting means on their top sides in the direction of the circular boundary border strip and be kept under this pressure.

This type of fastening permits the pulling out of the supporting plates of the shoes at the top by loosening the adjusting means, while they are kept in the operating state under the action of the pressure in such a way that a pressure is constantly exerted on the border seals, and their tight bearing on the sliding surface of the outer ball cup is thus ensured.

According to another feature of the invention, the adjusting means comprise pressure ring-segments which bear on the upper sides of the border seals and are pressed-on by means of pressure screws arranged in intervals. The arrangement can also be such that the pressure screws do not act directly on the pressure ring segments, but on pressure claws whose pressure cams bear on the pressure ring segments. Furthermore the pressure screws for the pressure claws and the pressure ring segments can be adjustable in threaded bores of pressure plates, which are secured on the circular upper edge surface of the inner ball cup, distributed over the circumference. It is of particular advantage if the supporting plates of the shoes, which are guided removably on guide bars, are pressed on by means of pressure screws arranged on separate pressure plates and acting on these supporting plates.

These measures suggested by the invention ensure an exact fit of the supporting plates by the pressure from the top on the circular boundary border strip and also the border seals of the supporting plates or shoes are pressed against each other, as well as upward and downward in such a way that a tight bearing on the surface of the outer ball cup is achieved.

In another embodiment the shoes are constructed so that a floating friction is achieved and maintained. To this end the sliding layers are provided with depressions to receive a lubricant. These depressions can only comprise one countersink for each shoe, or they can be divided into several countersinks. It is important that the inner ball cup is provided with lubricant feed bores which open into the depressions in the sliding layers, and that the lubricant feed bores are connected to a high pressure lubricant supply. This makes it possible to produce and maintain in the depressions of the sliding layers such a high lubricant pressure that surface contact of the sliding surfaces is avoided and floating contact is obtained. This results in a considerable extension of the life of the shoes.

Another improvement, both in the sealing of the shoes and in lubrication, can be achieved according to the invention if the inner ball cup is provided with additional lubricant discharge bores, which open into border strips which are lower than the sliding layers and border the latter. In the range of these border strips there is in the design according to the invention a cavity surrounding the sliding layer like a bank which is defined on the outside by the circumferential border strips. Due to the fact that the additional lubricant discharge bores open into these spaces, the lubricant is returned into the cycle.

Another objective for the solution of the problem in question is to provide an effective seal of that part of the outer ball cup surface which is covered by the sliding layers only in an angular inclination of the joint. It has already been suggested to protect this region by a ring seal. According to the invention, this circular seal is arranged in the bottom edge zone of the outer ball cup and comprises a plurality of ring seals arranged at small distances from each other. They are so designed according to another feature that each of the ring seals include a closed ring-shaped hollow body of an elastic material, and that these hollow bodies when inserted into annular grooves can be inflated with a gaseous or liquid pressure medium. It is of advantage if the inflatable ring-shaped hollow bodies have a substantially rectangular cross-section with a possible large pressure surface bearing tightly on the surface of the inner ball cup, and are provided on their back with projecting border strips which engage correspondingly dimensioned back tapers of the annular grooves.

By means of this sealing arrangement in cascade form it is possible to reduce the pressure difference in individual pressure stages, e.g. of 7.5 bar each, even in water depth of 300 m and more, so that atmospheric pressure is attained behind the last seal. The pressure difference, to be sealed off for the various stages, can also be higher, or more sealing rings can be provided.

Finally, another suggestion of the invention aims at keeping the bottom region of the sliding surface of the inner ball cup, in which the inflatable ring-shaped sealing bodies of the outer ball cup slide, absolutely clean and free of impurities. To this end a second bell, which is open at the top, is arranged inside the air or gas filled bell with a bottom opening in such a way that it adjoins with its closed bottom part the bottom edge of the bottom inner ball cup. This design has the effect that the bottom region of the inner ball cup is also kept free of sea water, so that contamination by sea water splashes is impossible, and overflowing lubricant can be absorbed and returned into the cycle.

The procedure according to the invention for replacing the shoes of the inner ball cup in the design as described here consists in that the high pressure lubricant supply of the shoes to be replaced is shut off and its adjusting means are loosened and removed, and that the shoes to be replaced are removed at the top by means of a removing tool used instead of the adjusting means, and that the new shoes to be inserted are then introduced by means of this tool. It is also suggested that the ring-shaped inflatable hollow body seals are so inflated before the start of the replacement that the air or gas pressure can be reduced in the space above the seals to atmospheric pressure.

An embodiment of the invention is represented schematically in the drawing, and will be described more fully below.

Accordingly it is an object of the invention to provide a universal joint for use in anchoring a surface platform to a sea bed which comprises an outer top wall cup having a bottom opening with an edge around the opening and an inner bottom ball cup disposed within the outer top cup enclosing the bottom thereof and having an exterior in slidable engagement with the interior of the outer top ball cup, and further including a bell forming an enclosed pressure space between the exterior of the two cups and ring seal bearings defined between the outer and inner cups adjacent the edge of the outer cup wherein the exterior of the inner cup has a plurality of shoes thereon bearing in sliding engagement against the interior of the outer cup and comprising a supporting plate having a substantially trapezoidal contour secured to the inner cup with a sliding layer within the contour secured to the plate and slidable on the interior of the top ball cup and including a border seal extending around the periphery of the supporting plates.

A further object of the invention is to provide a universal joint construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which a preferred embodiment of the invention is illustrated.

BRIEF DESCRIPTION OF THE DRAWINGS

In the drawings:

FIG. 3 is a partial elevational view showing the sliding layers on the inner ball cup;

FIG. 7 is a view similar to FIG. 4 but on a larger scale;

FIG. 8 is a view similar to FIG. 5 but on a larger scale; and

DETAILED DESCRIPTION OF THE PREFERRED EMBODIMENT

Figure 1:
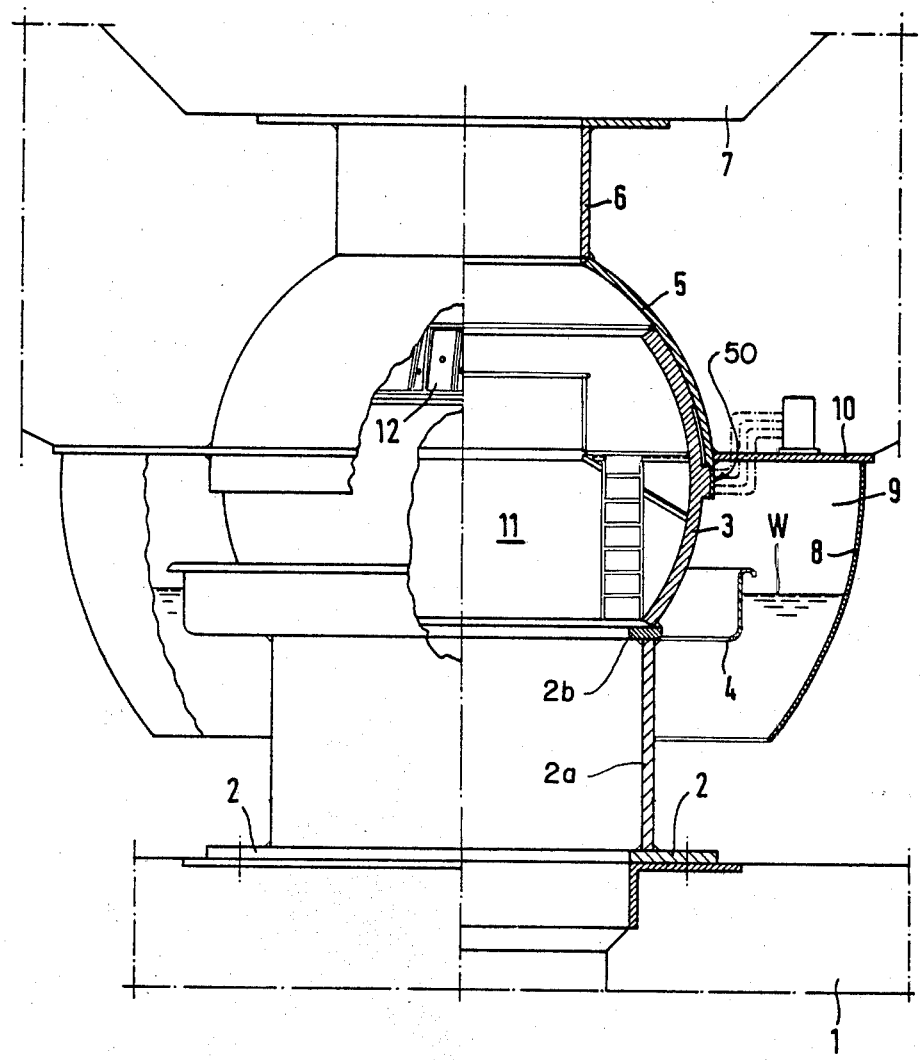
FIG. 1 is a partial elevational and partial sectional view of a universal joint constructed in accordance with the invention.

Referring to the drawings in particular the invention embodied therein comprises universal joints for use in anchoring a surface platform to a sea bed which will normally be located adjacent the foundation 1 on the sea bed. The universal joint comprises an outer top ball cup 5 having a bottom opening with an edge around the opening and an inner ball cup 3 disposed within the outer top ball cup and closing the bottom thereof. The inner bottom ball cup has an exterior in slidable engagement with the interior of the outer top ball cup. A bell 8 is provided which forms an enclosed pressure space 9 between the exterior of the outer top ball cup and the inner bottom ball cup. The ring seal bearing 50 is shown in more detail in FIGS. 2 and 9 and is provided on the outer ball cup and it provides a plurality of ring seals around the periphery of the inner ball cup to seal between the cups.

The exterior of the inner ball cups has a plurality of shoes thereon designated 12 and 13 in the form of spherical segments which are arranged in alternate arrangement around a portion of the periphery of the inner ball cup 3. The shoes comprise a supporting plate 14 and 15 having substantially trapezoidal and triangular contours respectively which are secured to the inner cup 3 and carry within their outline a sliding layer 16 or 17 which are in slidable engagement with the interior surface of the outer ball cup 5. A border seal 19 extends around the periphery of each of the supporting plates 14 and 15.

In FIG. 1, a part of the foundation anchored on the bottom of the sea is designated 1, on which the bottom inner ball cup 3 is detachably mounted by means of the basic construction including a foundation plate 2, cylinder 2a and cylinder plate 2b. The inner ball cup 3 is embraced by the top and outer ball cup 5 which is connected over a connecting construction 6 with a tower 7 carrying the surface platform. To the outer ball cup 5 is connected over platform type circulator ring disks 10 air bell 8 within which space 9 is filled with air, so that the water level W is attained. The water level is monitored in a manner not shown here, and at inadmissible deviations of level, the air filling space 9 is filled from a fluid pressure source so adjusted that the nominal water level is attained again. The additional bell 4 prevents the inner ball cup 3 from being wetted with sea water again in its bottom region, and it absorbs the overflowing and excess lubricant, which is returned directly into the cycle. The universal joint is so dimensioned that one can comfortably walk in its interior.

Figure 2:
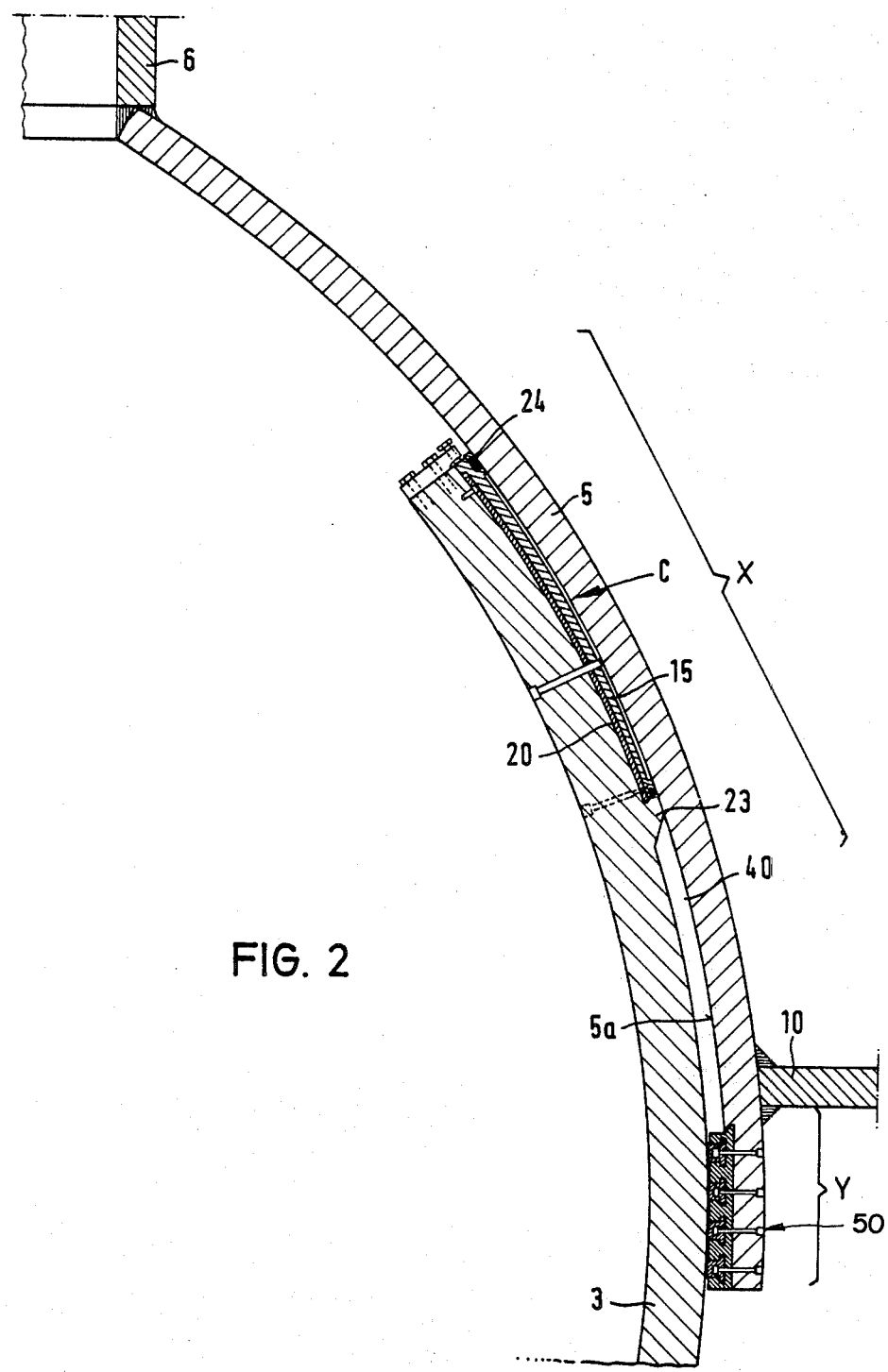
FIG. 2 is a partial sectional view of the ball cup shown in FIG. 1 on a slightly enlarged scale.

In FIG. 2 and the following FIGS., 12 and 13 denote the shoes and 14 and 15 the corresponding supporting plates. As can be seen from FIG. 3, wide shoes 12 alternate with narrow shoes 13. The details of shoes 12, 13 can be seen from FIGS. 3, 5 and 8. The supporting plates 14 and 15 are provided with circumferential or peripheral border strips 18 embracing a central sliding layer 16 on all sides, which in turn are surrounded by border seals 19. Border strips 18 thus define substantially closed contour areas for the layers 16 of each plate. The seals 19, just like sliding layers 16, bear tightly on the inner surface 5a of the outer ball cup 5 (FIGS. 2, 5, 6 and 8).

The narrow shoes 13 (FIGS. 3, 5 and 8) are guided on guide bars 20, which are secured by means of screws 21 on the inner ball cup 3. As it can be seen from FIGS. 6 and 8, grooves 22 on the underside of supporting plates 15 serve to receive guide bars 20.

Figure 4:
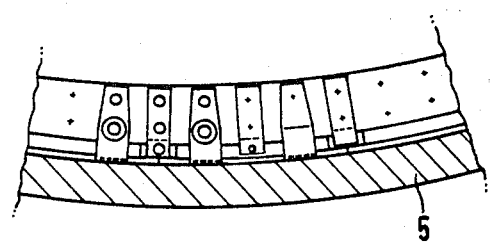
FIG. 4 is a partial sectional view of the outer ball cup showing the portion indicated in FIG. 3.
Figure 5:
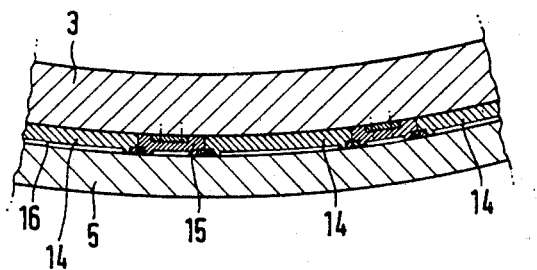
FIG. 5 is a section taken along the line 5—5 of FIG. 3.
Figure 6:
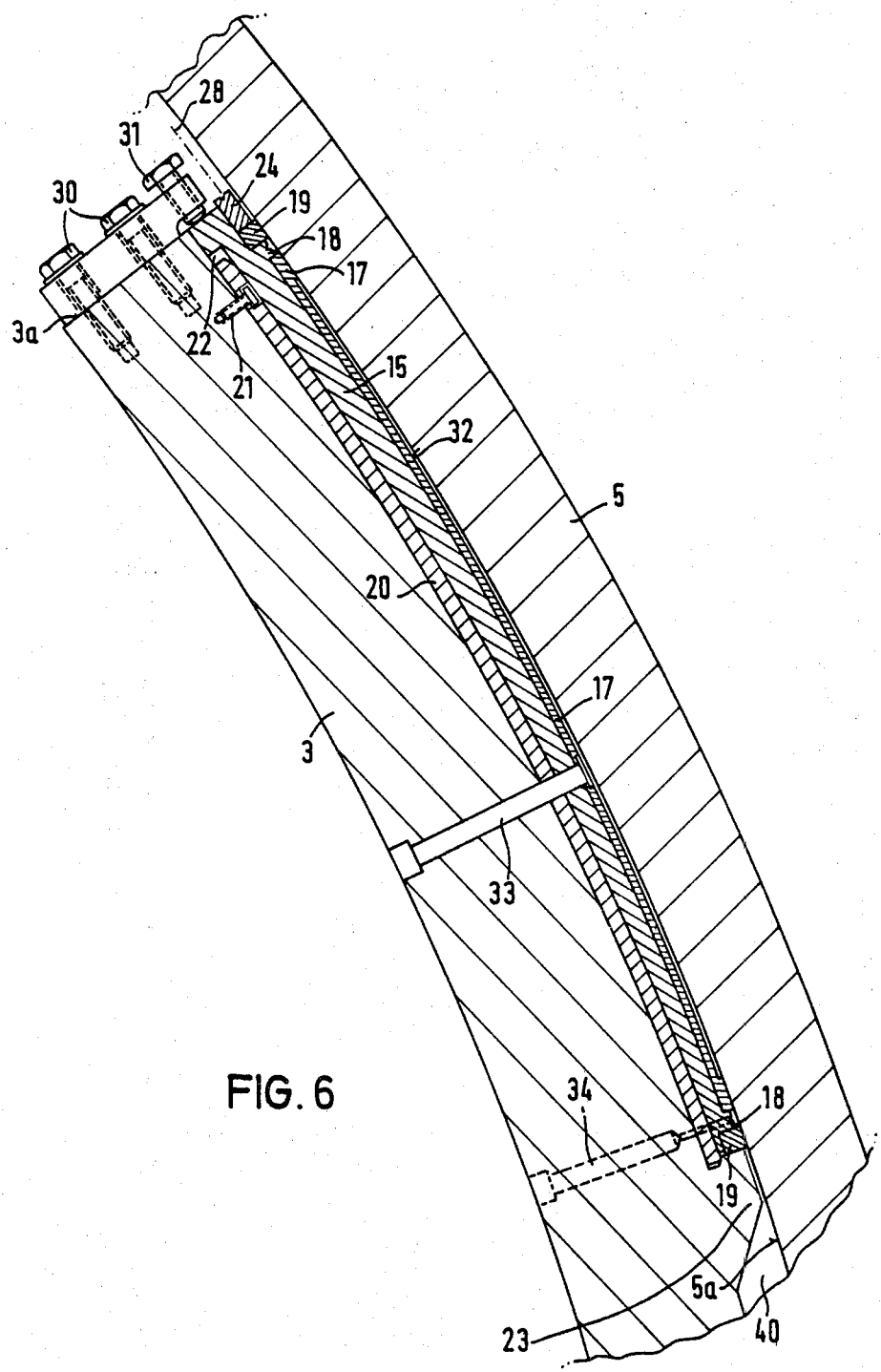
FIG. 6 is a partial sectional view of FIG. 2 but on a larger scale.

A pressure in the direction of circular boundary border strip 23 is exerted by the adjusting means of the inner ball cup 3 (see FIGS. 2, 3 and 6). The details of the adjusting means can be seen primarily from FIGS. 4, 6 and 7. The wide shoes 12 and their supporting plates 14 are pressed on their inner end faces by means of pressure screws 25 against boundary border strip 23, while pressure screws 31 transmit the pressure to the narrow shoes 13 and their supporting plates 15. These pressure screws 25 and 31 can be adjusted in bores of pressure plates 20, which are screwed by means of screws 30 on the upper end face 3a of the inner ball cup 3.

For pressing on the border seals 19 are provided the pressure ring segments 24 on which the pressure is exerted by means of pressure claws 27 and their pressure cam 28 respectively in this way that they are tightened by means of pressure screws 26, 30.

On supporting plates 14, 15 are formed depressions by border strips 18, into which sliding layers 16, 17 of PTFE are inserted. These are provided with a flat depression 32 for receiving a lubricant pad. Into these depressions (FIGS. 2 and 6) open bores 33 through the inner ball cup 3, which serve to feed a lubricant under high pressure. The corresponding bores 34 terminate in border strips 18, which are lower than sliding surfaces 16, 17 and perform the functions of lubrication and sealing.

Figure 9:
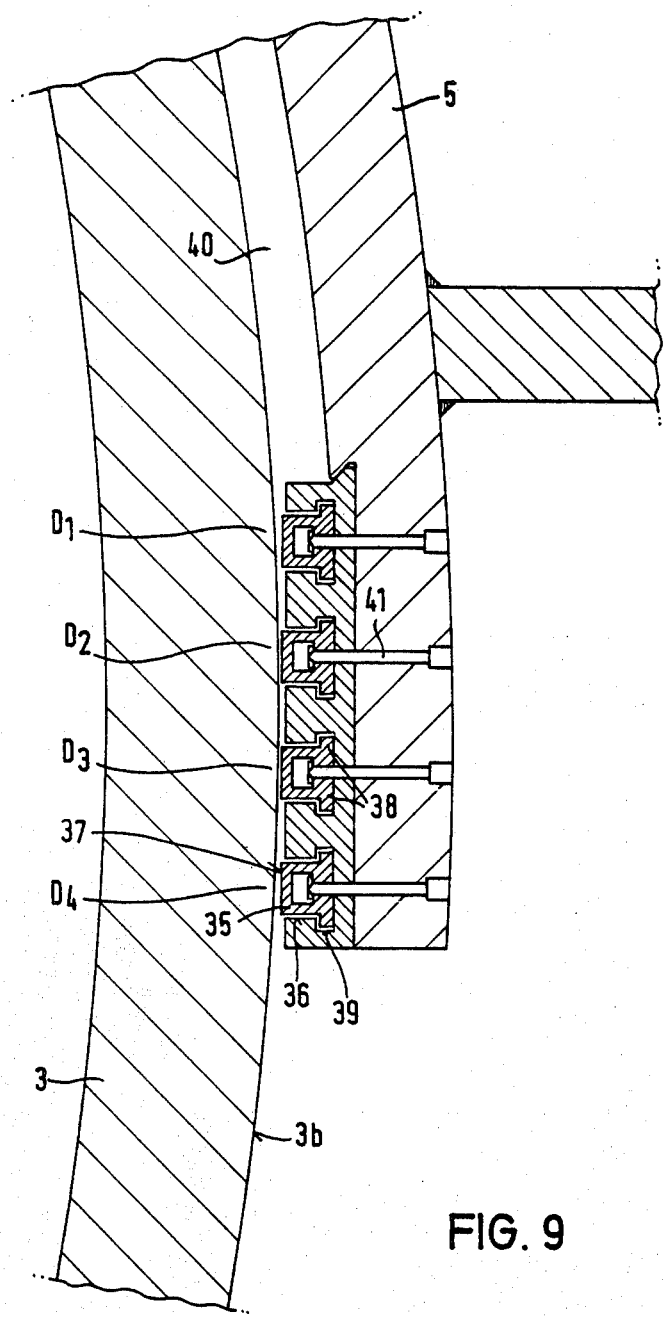
FIG. 9 is a partial sectional view similar to FIG. 2 and showing the ring seal.

As can be seen from FIGS. 2 and 9, four circular cylindrical seals D1, D2, D3 and D4 are arranged in the bottom region of the outer ball cup 5, which comprise inflatable ring-shaped hollow bodies 35 of an elastic material with a substantially rectangular cross-section. These are inserted in annular grooves 36 and held therein by means of their projecting border strips 38 which engage back tapers of grooves 39. For the introduction of compressed air or gas are provided feeds 41. By inflating the seals, space 40 between the two ball cups can be sealed off from the high pressure in space 9 of air ball 8 so that the air pressure in interior 11 of the universal joint no longer or hardly exceeds atmospheric pressure after removal of individual shoes.

For replacing the shoes 12 and 13, the seal arrangement D1 to D4 is actuated by inflating them, so that the pressure in space 40 is reduced. Then the corresponding adjusting means of the shoes to be replaced are loosened and removed, so that the removal tools (not shown) can be attached. These are also used for introducing the replacement shoes after removal of the old shoes and are then replaced again by the adjusting means.

The shoes can, of course, be removed by loosening the adjustment means in the form of plates 29 and claws 27, and lifting the plates upwardly, one at a time, above the upper edge of the lower inner ball cup 3. The process is reversed for inserting new shoes.

While a specific embodiment of the invention has been shown and described in detail to illustrate the application of the principles of the invention, it will be understood that the invention may be embodied otherwise without departing from such principles.

What is claimed is:

1. A universal joint for use in anchoring sea platforms to a sea bed which is adapted to be disposed adjacent the sea bed, comprising an outer top ball cup having a bottom opening with an edge around the opening, an inner bottom ball cup disposed within said outer top ball cup and enclosing the bottom thereof and having an exterior in slidable engagement with an interior of said outer top ball cup, a bell forming an enclosed pressure space between the exterior of said top ball cup and said inner bottom ball cup, a ring seal bearing defined between said inner bottom ball cup and said outer top ball cup adjacent the edge of said outer top ball cup, said inner bottom ball cup exterior between said ball cups having a plurality of shoes thereon bearing in sliding engagement against the interior of said outer top ball cup and each comprising a support plate having a substantially closed contour area defined by an enclosing border thereabout, each supporting plate secured to said inner bottom ball cup, a sliding layer within said contour area secured to said supporting plate and slidable on the interior of said outer top ball cup, and a border seal extending around the periphery of each of said supporting plates.

2. A universal joint according to claim 1, including a border strip extending around each of said sliding layers within said border seal, said sliding layers projecting from the surface of said plates by a greater amount than said border strip.

3. A universal joint according to claim 1, wherein said sliding layers comprise polytetrafluoroethylene.

4. A universal joint according to claim 1, wherein said supporting plates are of alternate substantially trapezoidal form in plan view, the border seals of adjacent shoes being embedded in the corner grooves of the adjacent border strip.

5. A universal joint according to claim 1, including guideways defined on said inner bottom ball cup, said supporting plates being in slidable removable engagement with said guideways.

6. A universal joint according to claim 1, including guideways defined between adjacent supporting plates for permitting slidable removal of each supporting plate as it is guided on a guideway of an adjacent supporting plate.

7. A universal joint according to claim 1, including a guide bar forming a guideway secured to the surface of said inner ball cup extending in a polar direction, said supporting plates being slidable on said guideways in corresponding grooves defined on the underside of said guideways.

8. A universal joint according to claim 7, wherein said guide bars are provided for every second one of said supporting plates disposed around said inner bottom ball cup.

9. A universal joint according to claim 1, wherein said supporting plates comprise alternate trapezoidal shaped supporting plates, adjacent plates being tapered in opposite directions.

10. A universal joint according to claim 9, wherein said trapezoidal shaped plates are of substantially the same width.

11. A universal joint according to claim 1, including guide bars defined on each of said supporting plates, said supporting plates including alternate ones of narrower dimension distributed around the surface of said inner bottom ball cup.

12. A universal joint according to claim 1, wherein said inner bottom ball cup includes a circumferential boundary strip extending outwardly from the surface, said supporting plates of said shoes bearing against said boundary border strips.

13. A universal joint according to claim 12, including adjustment means carried by said inner bottom ball cup and bearing against said supporting plates for adjusting the bearing pressure of said plates against said border strip.

14. A universal joint according to claim 13, wherein said adjusting means comprises ring segments which bear on the upper side of said border seals and a pressure screw engaging said support plates.

15. A universal joint according to claim 14, wherein said pressure screws include a pressure claw member engaged by said screws and bearing against said support plates.

16. A universal joint according to claim 15, wherein said pressure screws are threaded into said bottom inner ball cup.

17. A universal joint according to claim 1, wherein there are a plurality of shoes distributed around the circumference of said inner bottom ball cup, a pressure plate secured to said inner bottom ball cup and overlying said support plate, pressure screws carried by said pressure plate engageable against said support plate to urge it in a direction to engase against said circumferential boundary border strip.

18. A universal joint according to claim 1, wherein said sliding layers are provided with a depression for lubricant.

19. A universal joint according to claim 18, including lubricant feed bores defined in said inner bottom ball cup which open into said depressions.

20. A universal joint according to claim 1, wherein said inner ball cup is provided with lubricant feed bores which open into the space within said border seals.

21. A universal joint according to claim 1, including a circular seal bearing disposed on said outer ball bearing cup and bearing against said inner ball bearing cup adjacent the bottom edge of said outer top ball cup, said seal bearing comprising a plurality of circumferential seals arranged in spaced locations.

22. A universal joint according to claim 21, wherein each of said seals comprises a closed ring-shaped hollow body of elastic material, and means for inflating said hollow bodies with a fluid pressure.

23. A universal joint according to claim 22, wherein said hollow bodies have substantially rectangular cross-section and have a sealing surface bearing tightly against the exterior surface of said inner bottom ball cups, said hollow bodies having projecting strip portions, said outer top ball cup having recesses which include back tapers into which said strips are engageable.

24. A universal joint according to claim 1, including a second bell defined within said first bell having an open top, said first bell being filled with water to a prescribed level and having pressure air disposed above said water controlling the level thereof, said second bell opening into the air pressure.

25. In a universal joint for use in anchoring sea platforms to a sea bottom which is adapted to be disposed adjacent the sea bottom, and having an outer top ball cup with a bottom opening having an edge around the opening, an inner bottom ball cup disposed within the outer top ball cup and enclosing the bottom thereof and having an exterior in slidable engagement with the interior of the outer top ball cup, a bell forming an enclosed pressure space between the exterior of the top ball cup and the inner bottom ball cup, the inner bottom ball cup exterior between the ball cups having a plurality of shoes thereon bearing in sliding engagement against the interior of the outer top ball cup and each comprising a supporting plate having a substantially closed contour area defined by an enclosing border therebout with adjustment means for removably securing each plate to the inner bottom ball cup, a sliding layer within the contour area secured to the supporting plate and slidable on the interior of the outer top ball cup, a bearing seal extending around the periphery of each of the supporting plates, each plate having a pressure tab adapted for connection to a supply of lubricant for lubricating each sliding layer respectively, the method of replacing the shoes comprising the steps of:

disconnecting the pressure tab of a supporting plate of a pressure shoe to be replaced;

disconnecting the adjustment means from the pressure plate of the shoe to be removed for permitting sliding of the pressure plate to be removed with respect to the inner bottom ball cup;

sliding the supporting plate to be removed upwardly and out of a space between the inner and outer ball cups; and inserting a fresh shoe with supporting plate into the space vacated by the removed shoe with supporting plate.

26. A method according to claim 25, including; a ring sealed bearing defined between the inner bottom ball cup and the outer top ball cup adjacent the edge around the opening of the top ball cup, inflating the ring seal to form a closed seal between the inner and outer ball cups adjacent the edge area of the opening of the top ball cup and thereafter removing the shoe to be replaced.

* * * * *